United States Patent [19]

Vesper et al.

[11] 4,067,029
[45] Jan. 3, 1978

[54] ARRANGEMENT FOR THE DELAYED FIRING OF AN ELECTRONIC FLASH UNIT

[75] Inventors: Rainer Vesper; Dieter Engelsmann, both of Unterhaching, Germany

[73] Assignee: AGFA-Gevaert, AG, Leverkusen, Germany

[21] Appl. No.: 557,075

[22] Filed: Mar. 10, 1975

[30] Foreign Application Priority Data

Mar. 12, 1974 Germany .............................. 2411845

[51] Int. Cl.² ............................................. G03B 15/05
[52] U.S. Cl. .................................... 354/137; 354/141; 354/145
[58] Field of Search ............... 354/137, 138, 141, 145; 240/1.3

[56] References Cited

U.S. PATENT DOCUMENTS

| | | | |
|---|---|---|---|
| 3,550,514 | 12/1970 | Harvey | 240/1.3 X |
| 3,672,813 | 6/1972 | Horton | 354/141 |
| 3,731,605 | 5/1973 | Kitagawa | 354/141 |
| 3,882,519 | 5/1975 | Winkler et al. | 354/141 |

Primary Examiner—L. T. Hix
Assistant Examiner—Alan Mathews
Attorney, Agent, or Firm—Michael J. Striker

[57] ABSTRACT

An adapter effects delayed firing of an electronic flash unit in response to activation of a photographic camera of the type provided with a striking member which otherwise serves to effect firing of impact-fired flash bulbs. The adapter includes a housing configurated to be mounted on such a camera with a predetermined position relative to the striking member of such camera. Inside the housing an inertial body is mounted for swinging movement about a predetermined axis. A biasing arrangement urges the inertial body in a predetermined direction. A synchronizing switch device is activatable by the inertial body when the latter assumes a predetermined activating position, for effecting firing of an electronic flash unit. The inertial body is so located relative to the mounting portion of the housing as to be set into motion against the force of the biasing arrangement by the striking force of a striking member on a camera to which the adapter is connected. When so set in motion the inertial body describes a predetermined path of movement in which it reaches the activating position.

8 Claims, 3 Drawing Figures

ARRANGEMENT FOR THE DELAYED FIRING OF AN ELECTRONIC FLASH UNIT

BACKGROUND OF THE INVENTION

The invention relates to the firing of an electronic flash unit.

Some cameras are designed to cooperate with a flash unit operating upon the piezoelectric principle, or upon other principles. In the case of flash units operating upon the piezoelectric principle, for example, the camera is provided with a striking member which performs a striking movement in automatic response to camera activation, i.e., in automatic response to shutter release. An impact-fired flash bulb unit, for example comprised of a flash bulb cube, is mounted on the camera, and the impact-fired bulbs are fired in response to the firing voltage generated when the striking member of the camera strikes the piezoelectric transducer of the triggering device of the impact-fired flash bulb unit.

A problem of course arises when a camera adapted to cooperate with an impact-fired flash bulb unit is to be made to cooperate with an electronic flash unit not requiring impact to generate a flash, such as a rechargeable electronic flash unit, an electronic flash unit provided with non-rechargeable batteries, or the like. In general, in the prior art, a camera adapted to cooperate with an impact-fired flash bulb unit cannot be made to cooperate with a conventional electronic flash unit.

SUMMARY OF THE INVENTION

It is accordingly a general object of the invention to provide an arrangement which in a simple and reliable manner is operative for effecting delayed firing of a conventional electronic flash unit in response to the striking force exerted by a striking member of a photographic camera of the type ordinarily adapted to cooperate only with flash lamp units of the impact-fired type.

This object, and others which will become more understandable from the description, below, of preferred embodiments, can be met, according to one advantageous concept of the invention, by providing an inertial body mounted for pivoting movement about an axis and continuously subject to the force of a biasing spring, and a synchronizer contact arrangement, with the inertial body being moved out of a starting position by means of the striking member and moved through a predetermined angle into an activating position in which the synchronizing contacts are caused to electrically engage each other.

The biasing spring is advantgeously so configurated and dimensioned that its spring force is greater than the striking force exerted by the striking member upon the triggering device of an impact-fired flash lamp unit.

Advantageously, the striking member imparts to the inertial body a jolt causing the inertial mass to swing, against the force of the biasing spring, out of its starting position and into its activating position, in which it causes electrical engagement between the synchronizing contacts to be effected, for the purpose of effecting firing of an electronic flash unit. The time elapsing between performance of the striking movement by the striking member, on the one hand, and the closing of the synchronizing contacts, on the other hand, is in part determined by the angle through which the inertial body must swing to reach the activating position, and is in part determined by the mass of the inertial body and by the spring force of the biasing spring.

According to another advantageous concept of the invention, the inertial body, which preferably has the form of a disk, is provided with an engaging portion. An electrically conductive torsion spring is mounted on the housing of the adapter. One leg of the torsion spring projects into the path of movement of the engaging portion of the inertial body, offset from the normal position of the engaging portion by a predetermined angle. When the inertial body is set into motion by the striking member, the engaging portion of the inertial body engages the one leg of the torsion spring and presses it into electrical engagement with a first contact. The torsion spring has a second leg which is in electrical engagement with a second contact of the synchronizer switch device.

According to a still further concept of the invention, the biasing spring has the form of an electrically conductive two-legged torsion spring which itself serves to establish electrical engagement between the two contacts of the synchronizer switch device.

According to another advantageous concept of the invention, the inertial body has an engaging portion. A leaf spring is located intermediate the striking member and the engaging portion, and when the inertial body is in the starting position thereof, the engaging portion thereon rests against the leaf spring. When the striking member performs its striking movement, the leaf spring serves to transmit the force to the inertial body. Provision of such leaf spring results in an increase in the spring action opposite to the turning direction of the inertial body. Additionally, the leaf spring offers the advantage that, when the adapter is mounted on the photographic camera, undesired swinging movement of the inertial body in the adapter caused by the striking member is prevented. To this end the leaf spring force is stronger than the striking force exerted by the striking member upon a conventional impact-fired flash lamp unit.

According to a further concept of the invention, the inertial body is provided with a first engaging portion and the adapter housing is provided with a second engaging portion. The biasing spring is for example a two-legged torsion spring whose legs bear upon the two engaging portions, with the position of the first engaging portion being adjustable with respect to the inertial body and/or with the position of the second engaging portion being adjustable with respect to the adapter housing.

According to another concept of the invention, the earlier-mentioned two-legged torsion spring whose first leg projects into the path of movement of the inertial body and/or the earlier-mentioned first electrical contact against which the first leg is caused to press by the inertial body when the latter reaches its activating position are adjustable in their positions relative to each other and/or in their angular positions relative to the rotation axis of the inertial body and the normal or starting position of the engaging portion thereon.

The novel features which are considered as characteristic for the invention are set forth in particular in the appended claims. The invention itself, however, both as to its construction and its method of oeration, together with additional objects and advantages thereof, will be best understood from the following description of specific embodiments when read in connection with the accompanying drawing.

DESCRIPTION OF THE PREFERRED EMBODIMENTS

Figure 2:
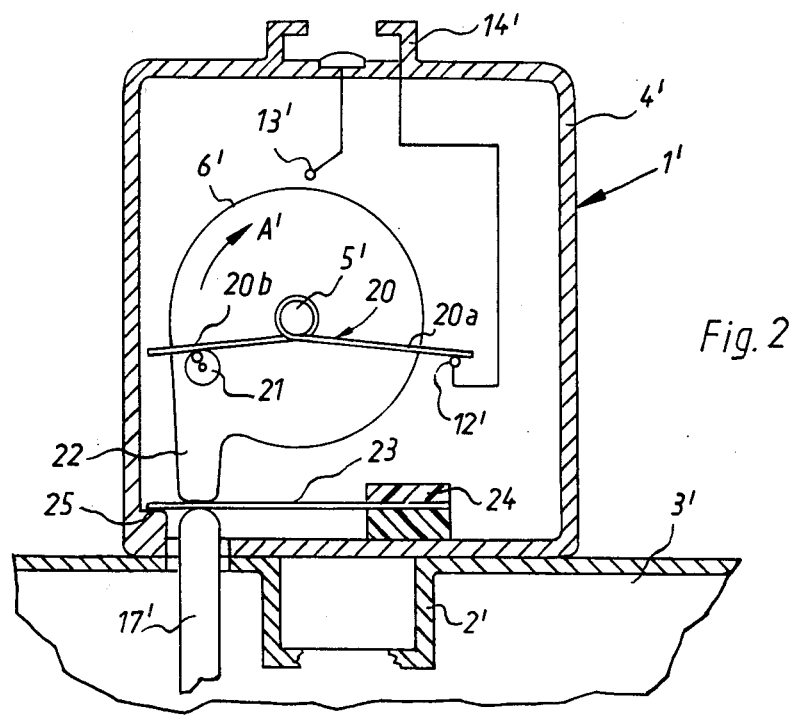
FIG. 2 depicts a second embodiment of the invention.
Figure 3:
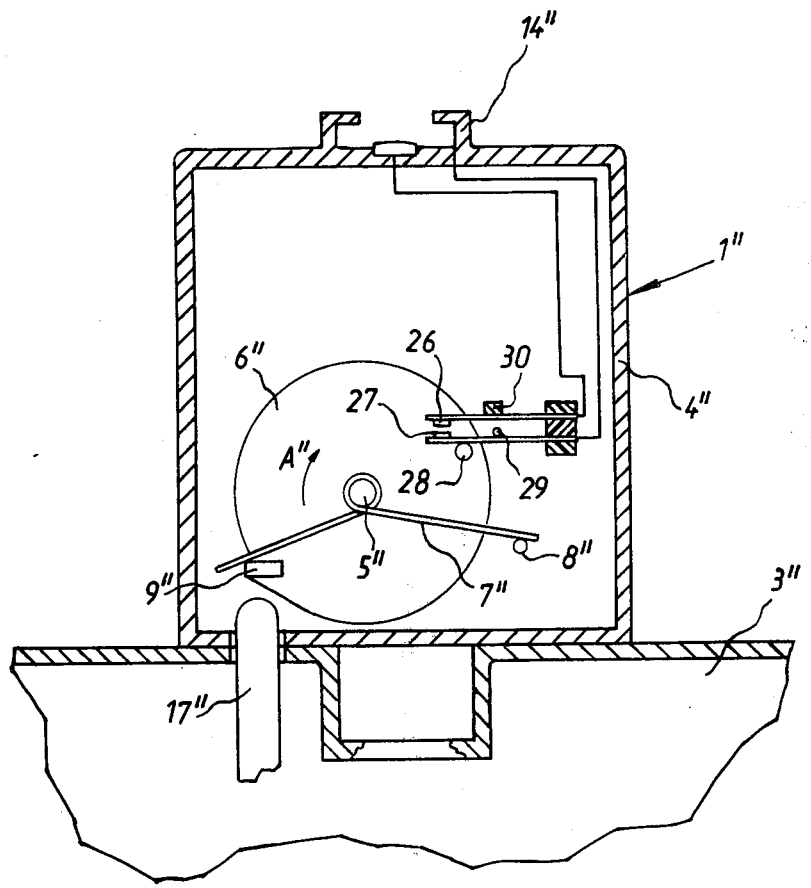
FIG. 3 depicts a third embodiment of the invention.

For the sake of simplicity, in the three Figures, corresponding parts are designated by the same reference numerals, but provided with a prime in FIG. 2, and with a double prime in FIG. 3.

Figure 1:
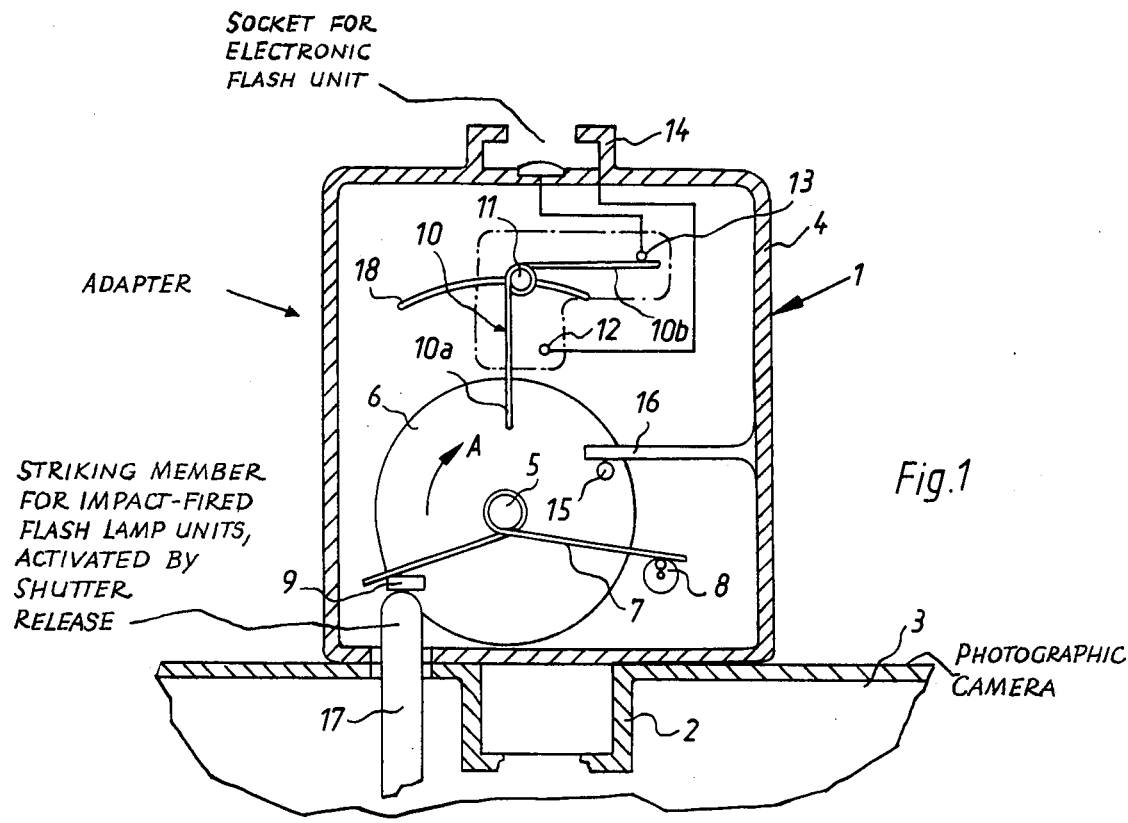
FIG. 1 depicts a first embodiment of the invention.

In FIG. 1, reference numeral 1 denotes an adapter insertable into the socket 2 of a photographic camera 3 of the type adapted to cooperate with impact-fired flash lamp units. The adapter to cooperate with impact-fired flash lamp units. The adapter has a housing 4 in which there is arranged a relatively heavy inertial body 6, in the form of a disk mounted for swinging movement about an axis defined by a pin 5. A two-legged torsion spring is wound round the pin 5. One of its legs bears upon an engaging portion 8 provided on the housing; the other leg bears upon an engaging portion 9 on the disk 6. The force of the two-legged torsion spring 7 acts opposite to the direction of arrow A.

Additionally provided in the housing 4 is an electrically conductive two-legged torsion spring 10, wound around a pin 11 mounted on the housing wall. The first leg 10a of this spring 10 projects into the path of movement of the engaging portion 9 of the disk 6 and can be pressed by such engaging portion into electrical engagement against a first contact 12. The second leg 10b of the electrically conductive torsion spring 10 is electrically connected to a second contact 13. The electrical contacts 12, 13 are connected by leads to electrodes located in the socket 14 of the adapter housing 4. These electrodes electrically engage corresponding electrodes of a non-illustrated electronic flash unit when such flash unit is inserted into the socket 14.

In the rest position of the disk 6, a pin 15 on the disk 6 abuts against a stop 16 secured to the housing wall 4.

Reference numeral 17 designates the striking member of the photographic camera 3. When the sutter release of the camera 3 is activated, the striking member 17 imparts a pulse of kinetic energy to the disk 6, as a result of which the latter turns in the direction of arrow A against the force of spring 7 and, after elapse of a certain delay time interval, effects electrical engagement between the contacts 12 and 13.

In order to make possible adjustments of the delay time interval, the contacts 12 and 13 and the pin 11 can be mounted on a common mounting plate which in turn is held against the housing wall by means of a screw passing through an arcuate slot 18. As one possibility, the pin 11 can constitute an extension of such screw, with the end of the screw opposite that provided with pin 11 being provided with a nut. In this way the aggregate comprised of the contacts 12, 13, and the two-legged torsion spring 10 wound round the pin 11, can be moved as a whole to different positions by moving the pin 11 along the arcuate slot 18 and/or by tilting this aggregate relative to the pin 11. Additionally, the engaging portion 8, against which one leg of the two-legged torsion spring 7 bears, is eccentrically located on a screwthreaded member; turning of the screwthreaded member causes the portion 8 to assume different positions, and thereby effects variations in the pre-tension of the torsion spring 7.

In the embodiment of FIG. 2, an electrically conductive two-legged torsion spring 20 is wound around the pivot pin 5' of a shutter disk 6'. One leg 20a bears upon the electrical contact 12', which is secured on the housing wall, whereas the other leg 20b bears against the adjustable-position engaging portion 21 on the disk 6'. Numeral 22 designates a projection on the disk 6' which, under the action of spring 20, is pressed against a leaf spring 23, one end of which is clamped in a part 24 of the housing 4, and the other or free end of which rests upon a ledge 25 on the housing wall.

When the adapter 1' is mounted in place on the photographic camera 3', the striking member 17' of the camera 3' projects into the housing 4 of the adapter 1' and presses against the leaf spring 23.

If now, in non-illustrated manner, the camera shutter release is activated, the striking member 17' will impart, via the leaf spring 23, a surge of kinetic energy to the projection 22 of the disk 6', and the latter will turn in the direction of arrow A'. After a certain delay time interval, the leg 20b of the electrically conductive torsion spring 20 strikes the contact 13', thereby establishing electrical engagement between the contacts 12', 13' and effecting firing of the non-illustrated electronic flash unit. The delay time interval in question is dependent upon the mass of disk 6', upon the force of springs 20 and 23, and upon the angle through which the disk 6 must turn.

In the embodiment of FIG. 3, a synchronizer switch 26, 27 comprised of two contacts is so positioned that a pin 28 on the disk 6" will activate switch 26, 27 not until the disk 6" has performed its return movement, in direction opposite to arrow A", and performed during such return movement a small overshoot. Specifically, the striking member 17" transmits via portion 9" to the disk 6" a surge of kinetic energy, causing the disk 6" to turn in the direction of arrow A". This causes a build-up of potential energy in the two-legged torsion spring 7". After turning through a certain angle, the disk 6" ceases to turn, and then begins to turn in direction opposite to arrow A", under the action of the stressed torsion spring 7". The disk 6" turns back towards its starting position but, because of its momentum, overshoots the starting position. During such overshoot, the pin 28 on the disk 6" presses the electrical contact 27 into engagement with the electrical contact 26. The stops 29, 30, both mounted on the wall of the adapter housing 4, are in contact with the contact members 26, 27 and serve to establish a well-defined starting position for the disk 6".

It will be understood that each of the elements described above, or two or more together, may also find a useful application in other types of constructions differing from the types described above.

While the invention has been illustrated and described as embodied in an arrangement wherein the adapter is separable from the electronic flash unit and does not form an integral part of the electronic flash unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adapter for effecting delayed firing of an electronic flash unit in response to activation of a photographic camera of the type provided with a striking member which otherwise serves to effect firing of impact-fired flash lamp units, comprising, in combination, a housing provided with mounting means for mounting said housing on such a camera with a predetermined position relative to the striking member of such camera; an inertial body mounted in said housing for swinging movement about a predetermined axis; biasing means urging said inertial body in a predetermined direction; and snchronizing switch means activatable by said body when the latter assumes a predetermined activating position for effecting firing of an electronic flash unit, said inertial body being so located relative to said mounting means as to be set into motion against the force of said biasing means by the striking force of a striking member on a camera on which the adapter is mounted to describe a predetermined path of movement in which said inertial body reaches said activating position, wherein said inertial body is provided with an engaging portion, wherein said switch means comprises a first and a second contact and an electrically conductive torsion spring mounted on said housing and having a first leg positioned in the path of movement of said inertial body to be moved by the latter into electrical engagement with said first contat and a second leg electrically connected to said second contact.

2. An adapter as defined in claim 1, wherein the force exerted by said biasing means upon said inertial body is adjustable.

3. An adapter as defined in claim 1, wherein the relative positions of said first contact and of said first leg are adjustable.

4. An adapter as defined in claim 1, wherein the angular position of said first contact relative to said axis is adjustable.

5. An adapter as defined in claim 1, wherein the angular position of said first leg relative to said axis is adjustable.

6. An adapter for effecting delayed firing of an electronic flash unit in response to activation of a photographic camera of the type provided with a striking member which otherwise serves to effect firing of impact-fired flash lamp units, comprising, in combination, a housing provided with mounting means for mounting said housing on such a camera with a predetermined position relative to the striking member of such camera; an inertial body mounted in said housing for swinging movement about a predetermined axis; biasing means urging said inertial body in a predetermined direction; and synchronizing switch means activatable by said body when the latter assumes a predetermined activating position for effecting firing of an electronic flash unit, said inertial body being so located relative to said mounting means as to be set into motion against the force of said biasing means by the striking force of a striking member on a camera on which the adapter is mounted to describe a predetermined path of movement in which said inertial body reaches said activating position, wherein said switch means is comprised of first and second electrical contacts, and wherein said switch means and said biasing means are together comprised of an electrically conductive torsion spring having a first leg connected to said inertial body for urging the latter in said predetermined direction and having a second leg electrically connected to said second contact, said torsion spring being so disposed that when said inertial body reaches said activating position said first leg electrically engages said first contact.

7. An adapter for effecting delayed firing of an electronic flash unit in response to activation of a photographic camera of the type provided with a striking member which otherwise serves to effect firing of impact-fired flash lamp units, comprising, in combination, a housing provided with mounting means for mounting said housing on such a camera with a predetermined position relative to the striking member of such camera; an inertial body mounted in said housing for swinging movement about a predetermined axis; biasing means urging said inertial body in a predetermined direction; and synchronizing switch means activatable by said body when the latter assumes a predetermined activating position for effecting firing of an electronic flash unit, said inertial body being so located relative to said mounting means as to be set into motion against the force of said biasing means by the striking force of a striking member on a camera on which the adapter is mounted to describe a predetermined path of movement in which said inertial body reaches said activating position, and further including a leaf spring connected to said housing and so positioned relative to said mounting means as to be located intermediate said inertial body and a striking member performing a striking movement to transmit force from the striking member to the inertial body to set the latter into motion, and so positioned relative to said inertial body that said biasing means urges said inertial body into a predetermined rest position in which said inertial body abuts against said leaf spring.

8. An adapter for effecting delayed firing of an electronic flash unit in response to activation of a photographic camera of the type provided with a striking member which otherwise serves to effect firing of impact-fired flash lamp units, comprising, in combination, a housing provided with mounting means for mounting said housing on such a camera with a predetermined position relative to the striking member of such camera; an inertial body mounted in said housing for swinging movement about a predetermined axis; biasing means urging said inertial body in a predetermined direction; and synchronizing switch means activatable by said body when the latter assumes a predetermined activating position for effecting firing of an electronic flash unit, said inertial body being so located relative to said mounting means as to be set into motion against the force of said biasing means by the striking force of a striking member on a camera on which the adapter is mounted to describe a predetermined path of movement in which said inertial body reaches said activating position, wherein said biasing means is a torsion spring normally urging said inertial body in a first direction into a first position, and wherein said switch means is so located relative to said mounting means that when said inertial body is set into motion by the striking force of a striking member said inertial body initially moves in opposite second direction and then performs a return movement in said first direction under the return force of said torsion spring causing said inertial body to overshoot said first position and reach said activating position.

* * * * *